(12) United States Patent
Wild

(10) Patent No.: US 12,140,684 B1
(45) Date of Patent: Nov. 12, 2024

(54) LOCATION DETERMINATION USING ANGLE-OF-ARRIVAL AND TIME-OF-FLIGHT

(71) Applicant: Hubble Network Inc., Las Vegas, NV (US)

(72) Inventor: Ben Juda Wild, Las Vegas, NV (US)

(73) Assignee: Hubble Network Inc., Seattle, WA (US)

( * ) Notice: Subject to any disclaimer, the term of this patent is extended or adjusted under 35 U.S.C. 154(b) by 7 days.

(21) Appl. No.: 18/542,448

(22) Filed: Dec. 15, 2023

(51) Int. Cl.
*G01S 19/46* (2010.01)
*G01S 19/43* (2010.01)

(52) U.S. Cl.
CPC .............. *G01S 19/46* (2013.01); *G01S 19/43* (2013.01)

(58) Field of Classification Search
None
See application file for complete search history.

(56) References Cited

U.S. PATENT DOCUMENTS

| | | | | |
|---|---|---|---|---|
| 6,330,452 B1* | 12/2001 | Fattouche | ................. | G01S 5/04 455/524 |
| 6,407,703 B1* | 6/2002 | Minter | ................. | G01S 5/0249 342/465 |
| 6,417,799 B1* | 7/2002 | Aubain | ..................... | G01S 5/12 342/356 |
| 8,866,672 B2* | 10/2014 | Stroud | ..................... | G01S 1/04 342/378 |
| 9,766,343 B2* | 9/2017 | Schleppe | .............. | G01S 19/215 |
| 11,237,277 B2* | 2/2022 | Goodrum | .................. | G01S 5/06 |
| 2014/0154972 A1* | 6/2014 | Mengwasser | ........ | H04B 7/1851 455/12.1 |
| 2016/0018509 A1* | 1/2016 | McCorkle | ................ | G01S 5/12 342/386 |

* cited by examiner

*Primary Examiner* — Vladimir Magloire
*Assistant Examiner* — David C. Schultz
(74) *Attorney, Agent, or Firm* — Nicholson De Vos Webster & Elliott LLP

(57) ABSTRACT

In one example method, a signal transmitted from an endpoint device is received at a first satellite and at one or more second satellites. The first satellite determines a first estimated position of the endpoint, an estimated position of the first satellite, and estimated frequencies and phases of one or more symbols transmitted in the signal. The first satellite then transmits this information to the one or more second satellites. The one or more second satellites use the information received from the first satellite to determine one or more estimated time differences of arrival between the signal arriving at the first satellite and the signal arriving at the one or more second satellites. The one or more second satellites then determine a second estimated position of the endpoint using the one or more estimated time differences of arrival.

20 Claims, 9 Drawing Sheets

LOCATION DETERMINATION USING ANGLE-OF-ARRIVAL AND TIME-OF-FLIGHT

BACKGROUND

A satellite tracking system uses satellites to provide autonomous geo-spatial positioning. It allows satellite tracking devices on Earth to determine their position (longitude, latitude, and altitude/elevation) to high precision using time signals transmitted along a line of sight by radio from satellites. The system can be used for tracking the position of an object on Earth that has been fitted with a transmitter (satellite tracking), as well as for other applications (e.g., navigation).

BRIEF DESCRIPTION OF DRAWINGS

Various embodiments in accordance with the present disclosure will be described with reference to the drawings, in which.

DETAILED DESCRIPTION

Figure 1:
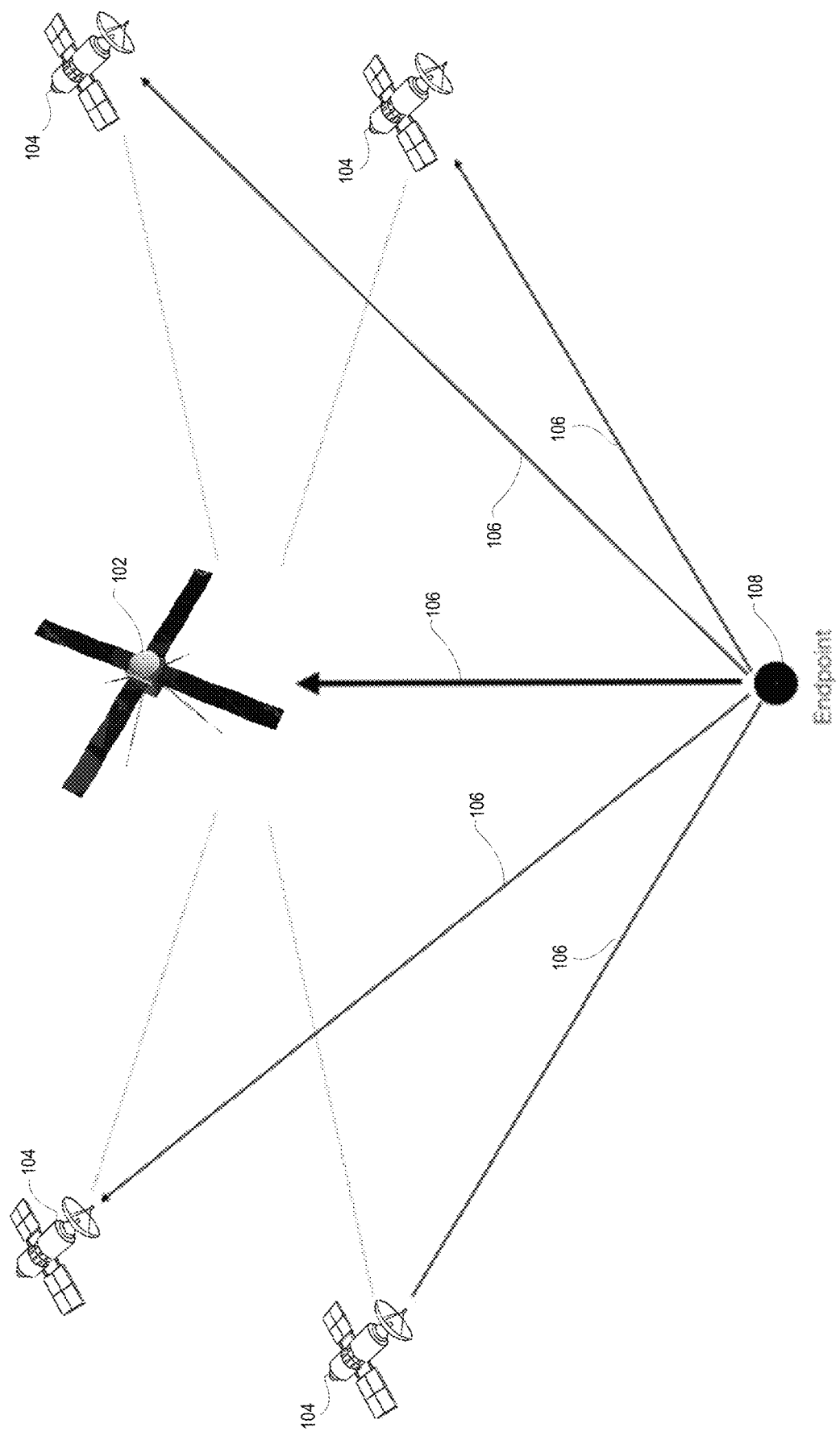
FIG. 1 is a schematic diagram illustrating communication between a wireless endpoint device on Earth and a satellite network according to some embodiments.

The present disclosure relates to wireless systems for position determination, such as satellite tracking systems. For example, a satellite navigation system with global coverage is a global navigation satellite system (GNSS). Examples of GNSSs include the United States' Global Positioning System (GPS), Russia's Global Navigation Satellite System (GLONASS), China's BeiDou Navigation Satellite System, and the European Union's Galileo. Global coverage for each system is generally achieved by a satellite constellation of 18-30 medium Earth orbit (MEO) satellites spread among several orbital planes. The actual systems vary, but generally use orbital inclinations of >50° and orbital periods of roughly twelve hours (at an altitude of about 12,000 miles). These systems require three or more satellites to allow for a radio receiver to estimate its position on Earth.

For asset tracking, a GPS chip typically reports the position of the asset. The GPS chip is used to estimate the asset's location, and the location is reported to a terrestrial or satellite network. One drawback of using a GPS chip for device tracking is that it increases the power consumption and cost of the device being tracked. It would thus be beneficial to determine the device's location using a satellite network without using a GPS chip. Embodiments described herein combine angle-of-arrival coarse positioning techniques with time-of-flight precise positioning techniques to implement a low-complexity and highly accurate solution to locate tracking devices without the need for GPS chips. In some embodiments, the tracking devices transmit signals using groups of narrowband signals, and the satellites process the received signals using both angle-of-arrival coarse positioning and time-of-flight precise positioning. In various embodiments, the techniques described herein can be applied to different physical layer signals such as M-ARY FSK (Frequency-Shift Keying) or Orthogonal Frequency Division Multiplexing (OFDM) used in the LTE (long-term evolution) standard for wireless broadband communication and the NB IoT (Narrowband Internet of Things) LPWAN (low-power wide-area network) radio technology standard.

Time-of-flight radio measurements get more accurate as the bandwidth of the signal being measured increases. For example, the bandwidth of the GPS coarse acquisition signal is around 1 MHZ. Some of the present embodiments use M-ARY FSK modulation where each symbol is only 125 Hz in bandwidth. However, the effective bandwidth is larger, and is determined by the spread between the minimum symbol frequency and the maximum symbol frequency. Thus, in some embodiments, the entire bandwidth of the receiver is around 781.25 KHz. Assuming that the M-ARY FSK signal is hopping over close to the entire bandwidth, the entire sequence of symbols can be used as a code to measure the time-of-flight to three or more satellites. Then, using time difference of arrival (TDOA) similar to GPS, the position of an endpoint on the ground can be estimated. Examples of this process are described below.

In some embodiments, a satellite constellation includes first satellites (also referred to herein as main satellites) and second satellites (also referred to herein as assistant satellites). Main satellites include multiple antenna elements that are used to receive packets from trackers on Earth (also referred to herein as endpoint devices or endpoints) and determine a rough location estimate for the endpoint using angle-of-arrival techniques. Assistant satellites may be smaller and/or less complex (e.g., fewer antenna elements) than main satellites, and these satellites also receive packets from the endpoints. The assistant satellites may have different form factors relative to the main satellites, such as a square form factor, but preferably have enough beamforming gain to achieve a desired level of location accuracy for the endpoint.

FIG. 1 illustrates a main satellite 102 and four assistant satellites 104 surrounding the main satellite 102. In some embodiments, two assistant satellites 104 may be paired with a main satellite 102, though in other embodiments any number of assistant satellites 104 may be paired with a main satellite 102. In the non-limiting example of FIG. 1, two of the assistant satellites 104 are paired with the main satellite 102 from an adjacent orbital plane, and two of the assistant satellites 104 are paired with another main satellite 102 (not shown) in an adjacent orbit. The physical configurations of the satellites 102, 104 shown in FIG. 1 are illustrative only, and are in no way limiting of the present embodiments.

With reference to FIG. 1, in one non-limiting example process, one of the main satellites 102 first receive-beamforms and decodes packets in a signal 106 from an endpoint 108 on Earth. In some embodiments, this decoding may be a standard FFT (fast Fourier transform) decoding technique, or an OFDM decoding technique such as those used in the LTE or NB IoT standards. For example, in radio communications, orthogonal modulation is used to improve the radio sensitivity for a target communication rate by spreading the available energy over as much bandwidth as is practical. An example of orthogonal modulation is M-ARY Frequency Shift Keying (FSK) modulation in which $\log_2$(M) bits are mapped to one of M orthogonal frequency tones and one of the possible tones is sent out over the communication channel to encode the bits. At the receiver, each received tone is then demodulated and translated back to the correct bits. In another example, in OFDM, the incoming bitstream representing the data to be sent is divided into multiple streams. Multiple closely spaced orthogonal subcarrier signals with overlapping spectra are transmitted, with each carrier modulated with bits from the incoming stream so multiple bits are transmitted in parallel. Demodulation is based on FFT algorithms. Each subcarrier (signal) is modulated with a conventional modulation scheme (such as quadrature amplitude modulation (QAM) or FSK) at a low symbol rate. This maintains total data rates similar to conventional single-carrier modulation schemes in the same bandwidth.

Since the signal 106 from the endpoint 108 can be fairly weak (e.g., a receive power of approximately-143 dBm after beamforming), the frequency and phase estimates of each symbol in the signal 106 are corrupted by noise. The frequency resolution is further limited by the size of the FFT block used in the decoder. In one non-limiting example, the FFT block might provide approximately 40 Hz (Hertz) of frequency resolution, though any amount of frequency resolution may be provided in various embodiments. The signal 106 received at the main satellite 102 is also received at one or more of the assistant satellites 104, and these received signals 106 will have slightly different frequency-domain characteristics due to different Doppler frequency shifts at the various satellites caused by motion of the satellites and their different positions relative to the endpoint 108.

Figure 2:
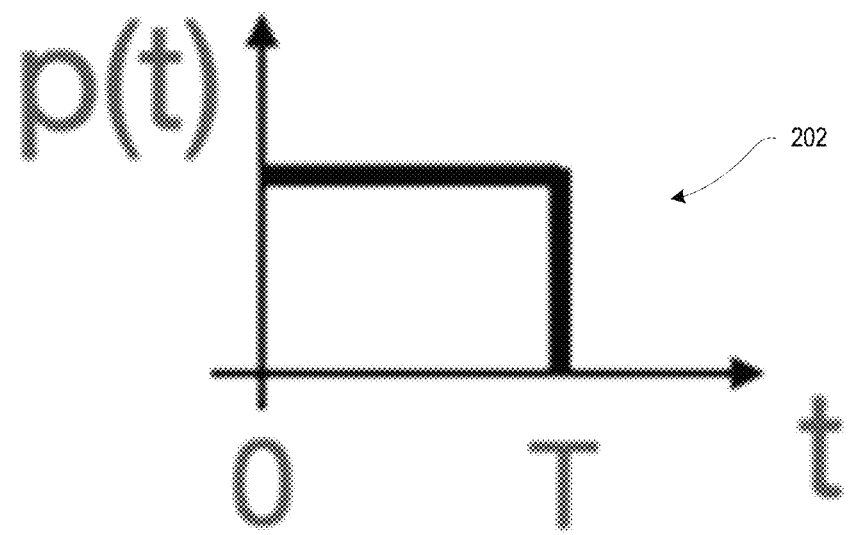
FIG. 2 is a graph illustrating a pulse function according to some embodiments.

One non-limiting example algorithm for position determination according to the present embodiments is described below. In this example embodiment the endpoint 108 transmits the signal 106 that includes multiple symbols to form an N-symbol packet. To construct the signal 106, we begin with a pulse function 202 as shown in FIG. 2, where p (t)=1 for 0<t<T, and p (t)=0 otherwise, where T is the symbol period. Using the pulse function 202, the entire baseband portion of the packet signal, which includes N frequency tones, $f_k$, can be expressed in complex baseband notation as:

$$s(t) = \sum_{k=1}^{N} p(t - kT) e^{j(2\pi f_k t + \theta_k)} \quad \text{Eq. 1}$$

The Ox parameters are the phase shifts of each frequency tone, which can be random. For example, if the radio is turned off between symbol transmissions, then every time the radio is turned back on the carrier signal has a random phase shift, denoted by the Ox term in Equation 1 above. The baseband signal is modulated with an ideal carrier frequency to form the signal 106 that is transmitted over the air. In one non-limiting example the ideal carrier frequency may be approximately 2.48 GHz, though any frequency may be used as the ideal carrier frequency in various embodiments. The frequency errors in the transmitted non-ideal carrier signal are lumped into the baseband signal. The ideal carrier signal is described as:

$$c(t) = \sum_{k=1}^{N} p(t - kT) e^{j(2\pi f_c t + \psi_k)} \quad \text{Eq. 2}$$

Again, the assumption is that the radio is turned off between symbol transmissions, and every time the radio is turned back on the carrier signal has a random phase shift, denoted by the Wx term in Equation 2 above.

The over-the-air signal 106 is the baseband signal multiplied by the carrier signal (Eq. 1 multiplied by Eq. 2), and is expressed as:

$$v(t) = \sum_{k=1}^{N} p(t - kT) e^{j(2\pi f_k + \theta_k)} * e^{j(2\pi f_c t + \psi_k)} \quad \text{Eq. 3}$$

The signal 106 propagates through space from the endpoint 108 and reaches the main satellite 102 and multiple assistant satellites 104. These satellites are in motion, so the signals 106 received at each satellite are Doppler-shifted due to this motion. Mathematically, the signals 106 received at each satellite are represented as Equation 4 (main satellite 102) and Equation 5 (assistant satellites 104), where $T_M(t)$ is the time varying propagation delay between the endpoint 108 and the main satellite 102, and $T_A(t)$ is the time varying propagation delay between the endpoint 108 and the assistant satellite 104:

$$r_M(t) = \sum_{k=1}^{N} p(t - T_m(t) - kT) e^{j(2\pi f_k(t - T_m(t)) + \theta_k)} * e^{j(2\pi f_c(t - T_m(t)) + \psi_k)} \quad \text{Eq. 4}$$

$$r_A(t) = \sum_{k=1}^{N} p(t - T_a(t) - kT) e^{j(2\pi f_k(t - T_a(t)) + \theta_k)} * e^{j(2\pi f_c(t - T_a(t)) + \psi_k)} \quad \text{Eq. 5}$$

The received signal 106 first gets down-converted to baseband by the satellite's local oscillator. The satellite's local oscillator cannot be perfectly tuned to the ideal carrier frequency, $f_c$, and its frequency cannot be estimated perfectly. In some embodiments, atomic clocks may be used to obtain very accurate time and frequency synchronization among the satellites. For example, each of the satellites may include an onboard atomic clock. Alternatively, to lower-cost, in some embodiments each of the satellites may include an onboard oven-controlled crystal oscillator, such as the NI-10 MHz-3500 Series Double Oven Controlled Crystal Oscillator available from Taitien (Taiwan). In such embodiments, the initial accuracy of the oscillator is 0.1 ppm (parts per million), which translates to a potential initial offset error of around ±250 Hz, and the frequency stability is around ±0.15 Hz over the temperature range that the satellites observe. To remove the initial offset error, in some embodiments the oscillator may be calibrated with a 1 PPS (pulse-per-second) signal (e.g., from a GNSS receiver) to estimate the actual oscillator frequency as precisely as possible. For example, GNSS chips that are designed for precise timing applications can achieve an accuracy of around ±5 ns (nanoseconds). With ±5 ns error on the 1PPS GNSS signal, and using a measurement interval of 100 seconds, the actual carrier frequency can be estimated to within ±0.15 Hz. Once adjusted for the carrier frequency offset, the ±0.15 Hz frequency error will not have a significant impact on the accuracy of the location determination processes according to the present embodiments.

Ignoring the carrier frequency offsets, the output of the down-conversion step in the receiver, which is the result of multiplying the received signal by the carrier signal, is represented as Equation 6 (main satellite 102) and Equation 7 (assistant satellites 104):

$$r'_M(t) = \sum_{k=1}^{N} p(t - T_m(t) - kT)e^{j(2\pi f_k(t-T_m(t))+\theta_k)} * e^{-j(2\pi f_c(T_m(t))+\psi_k)} \quad \text{Eq. 6}$$

$$r'_A(t) = \sum_{k=1}^{N} p(t - T_a(t) - kT)e^{j(2\pi f_k(t-T_a(t))+\theta_k)} * e^{-j(2\pi f_c(T_a(t))+\psi_k)} \quad \text{Eq. 7}$$

The terms above that still contain the $f_c$ components are the Doppler frequency shift components at the main satellite 102 and the assistant satellites 104. In some embodiments, the satellite precise position is known because each satellite has an onboard GNSS (e.g., GPS) receiver, but the position of the endpoint 108 is unknown. To determine the position of the endpoint 108, in some embodiments the main satellite 102 first uses an angle-of-arrival positioning technique to get a rough estimate of the endpoint 108 position. A non-limiting example of such a technique is described in U.S. patent application Ser. No. 18/196,989, filed on May 12, 2023, now U.S. Pat. No. 11,774,546, the entire contents of which are incorporated herein as if fully set forth. Portions of the '989 application are also included herein as an Appendix. With a 2 m long antenna array, the endpoint 108 position can be estimated to within approximately 600 m using the technique described in the Appendix.

The phase difference between the main satellite 102 frequency tones and the assistant satellite 104 frequency tones (assistant satellite 104 phase minus main satellite 102 phase), measured at the beginning of each symbol tone (t=kT, k=0, . . . . N-1), is represented as Equation 8, where k is the symbol number (k=0, . . . . N-1) and T is the symbol duration:

$$\text{phasediff}_k = 2\pi(f_k + f_c)(T_{TDOA}(t = kT)) \quad \text{Eq. 8}$$

TDOA (time difference of arrival) is defined as the time of arrival of the endpoint 108 signal 106 at the assistant satellite 104 minus the time of arrival of the endpoint 108 signal 106 at the main satellite 102. To calculate the TDOA, Equation 8 is multiplied by the complex conjugate of the symbol tone frequency estimates, and multiplied by a guess of the TDOA. The best guess optimizes Equation 9:

$$\underset{T_{TDOA_{est}}}{\text{MAX}} \left| \sum_{k=1}^{N} e^{j(\text{phase diff}_k)} * e^{-j2\pi(f_{k_{est}}+f_c)(T_{TDOA_{est}}(t=kT))} \right|^2 \quad \text{Eq. 9}$$

Once the assistant satellites 104 calculate the relative delay between the signal 106 arriving at the respective assistant satellites 104 versus the main satellite 102, in some embodiments the assistant satellites 104 send this information down to one or more ground stations, where the relative delays are combined and a TDOA computation is performed using Equation 10 to estimate the endpoint 108 position. In alternative embodiments, the information received at the one or more ground stations may be forwarded to a computer network (e.g., a cloud provider network), and the computer network may perform the computations using Equation 10.

$$\underset{X,Y}{\text{MIN}} \sum_{k=1}^{K} \left| t_k - \left( \frac{1}{C} * \sqrt{(X - X_{SAT_c})^2 + (Y - Y_{SAT_c})^2 + Z_{SAT_c}^2} - \frac{1}{C} * \sqrt{(X - X_{SAT_{com}})^2 + (Y - Y_{SAT_{com}})^2 + Z_{SAT_{com}}^2} \right) \right|^2 \quad \text{Eq. 10}$$

In Equation 10, K is the number of assistant satellites 104 that receive the endpoint 108 signal 106 and $t_k$ is the TDOA between the respective assistant satellites 104 and the main satellite 102. The X, Y position of the endpoint 108 is calculated using Equation 10 by minimizing the sum of squares of the difference between the measured time differences between the respective assistant satellites 104 and the main satellite 102, $t_k$, (where k in this case is the assistant satellite 104 number) and the actual TDOAs for the X, Y position of the endpoint 108. If the Z position of the endpoint 108 is known, then three or more total satellites (main+two assistants) are needed to solve Equation 10. For example, in some embodiments a topographical map of the Earth combined with the rough endpoint 108 position estimate calculated by the main satellite 102 can be used to approximate the Z position of the endpoint 108. If the Z position of the endpoint 108 is unknown (e.g., because the endpoint 108 is aboard an aircraft with an unknown altitude), then Equation 10 can be modified to incorporate the unknown Z position, and in that case four or more total satellites (main+three assistants) are needed to solve for the X, Y position of the endpoint 108 using Equation 10.

In some embodiments, the least-squares algorithm of Equation 10 can be improved by weighting the respective assistant-satellite measurements differently depending on the respective positions of the assistant satellites 104 and their respective received signal 106 strengths. For example, an assistant satellite 104 that is farther away from the endpoint 108 and with a weaker received signal 106 strength might contribute negatively to the solution to Equation 10 if the information received from that assistant satellite 104 is weighted equally with information received from other assistant satellites 104 that are closer to the endpoint 108 and with stronger received signal 106 strengths.

Figure 3:
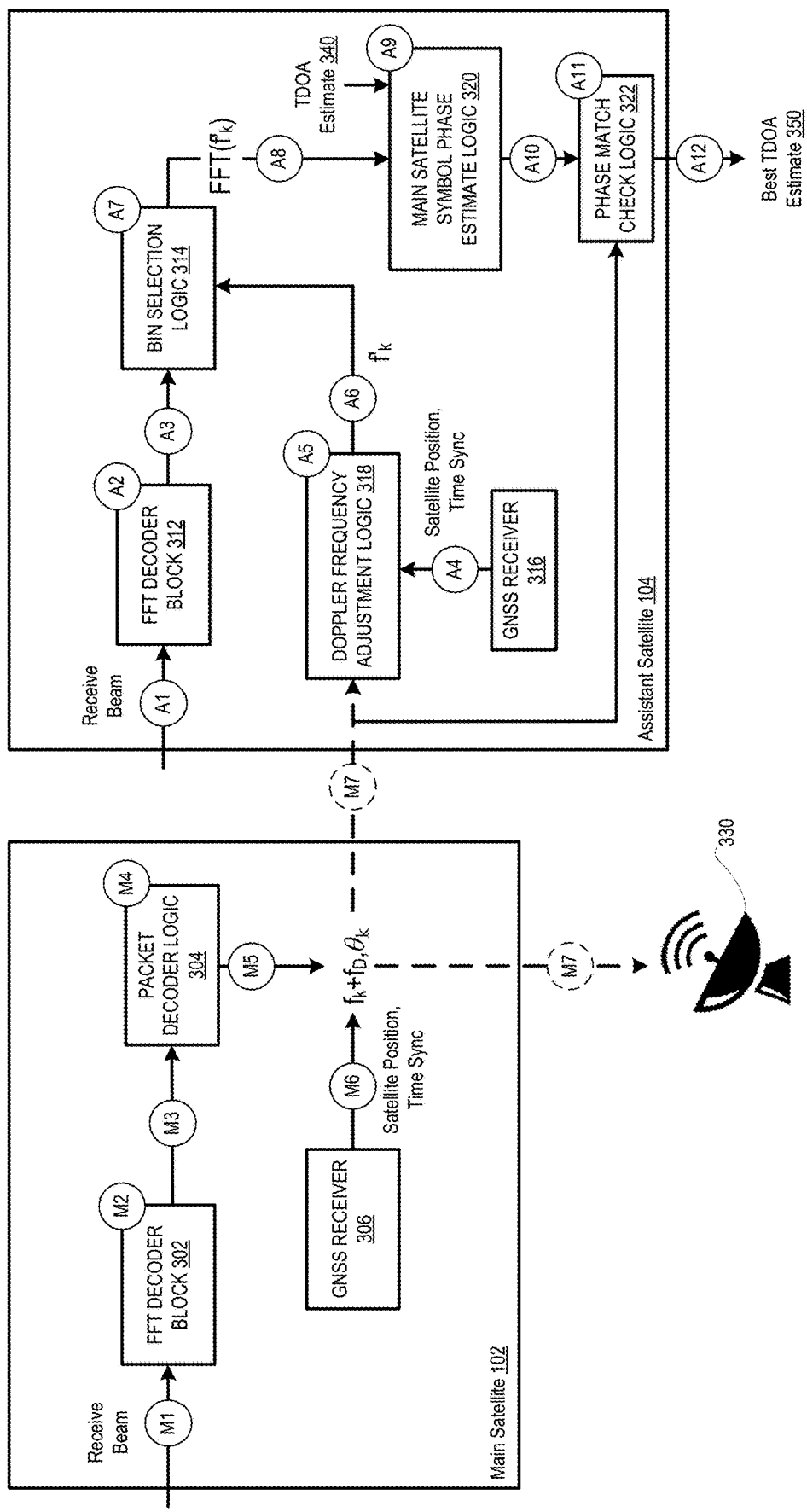
FIG. 3 is a functional block diagram illustrating components of a first satellite and a second satellite according to some embodiments.

FIG. 3 is a functional block diagram illustrating components of a first satellite (main satellite 102) and a second satellite (assistant satellite 104) according to some embodiments. FIG. 3 and its written description illustrate one way to implement the TDOA estimations described above, but alternative implementations are also contemplated. With reference to the left-hand side of FIG. 3, the illustrated embodiment of the main satellite 102 includes at least an FFT decoder block 302, packet decoder logic 304, and a GNSS (e.g., GPS) receiver 306. With reference to the right-hand side of FIG. 3, the illustrated embodiment of the assistant satellite 104 includes at least an FFT decoder block 312, bin selection logic 314, a GNSS (e.g., GPS) receiver 316, Doppler frequency adjustment logic 318, main satellite 102 symbol phase estimate logic 320, and phase match check logic 322. Each of the components identified as a block or logic in FIG. 3 may be implemented using one or more processors (not shown in FIG. 3) executing instructions stored in memory (not shown in FIG. 3).

With continued reference to FIG. 3, at circle (M1) the signals 106 from the receive radio beams at the main satellite 102 are received as input by the FFT decoder block 302, which converts the time-domain signals 106 to the frequency domain. While not shown in FIG. 3, the main satellite 102 includes antennas, such as one or more linear antenna arrays in which the antennas are spaced by up to one-half of a wavelength of the carrier frequency. The FFT decoder block 302, at circle (M2), decodes data symbols from the signals 106 received by the antennas. The output from the FFT decoder block 302 (decoded data symbols) is used to estimate the rough endpoint 108 position using an angle-of-arrival processing technique, such as that described above and in the Appendix. The output from the FFT decoder block 302 and the rough estimate of endpoint 108 position) are then passed as input to the packet decoder logic 304 at circle (M3).

At circle (M4), the packet decoder logic 304 uses the input from the FFT decoder block 302 to estimate the frequency ($f_k$) of each arriving symbol plus the Doppler shift at the main satellite 102 ($f_D$), and the phase of each symbol (Ok) is then read out from that FFT frequency bin. This information is output from the packet decoder logic 304 at circle (M5).

The GNSS receiver 306 of the main satellite 102 performs two functions. The first function is providing an estimated position of the main satellite 102. In some embodiments, this satellite position estimate may be smoothed out using the estimated satellite velocity and historical positions reported by the GNSS receiver 306. The second function of the GNSS receiver 306 is time synchronizing the satellites used for estimating the endpoint 108 position. The GNSS receiver 306 outputs the estimated satellite position (e.g., X, Y, Z coordinates) and the time synchronization information (the 1 PPS signal 106 described above) at circle (M6). The 1 PPS signal 106 output from the GNSS receiver 306 has an error of around 5 ns (one sigma). This signal 106 is used to estimate the frequency of the main satellite's digital sampling clock oscillator, and to synchronize the digital sampling clocks across the satellites used for estimating the endpoint 108 position so that all satellites are sampling the incoming down-converted radio signal 106 at roughly the same time.

At circle (M7), in some embodiments the main satellite 102 sends the frequency and phase for each decoded symbol, along with the main satellite's GNSS location and the time synchronization information (which are output from the GNSS receiver 306), to the assistant satellites 104 that aid in the location estimate for the endpoint 108. In alternative embodiments discussed below, at circle (M7) the main satellite 102 may send the frequency and phase for each decoded symbol, along with the main satellite's GNSS location and the time synchronization information, to a ground station 330, rather than to the assistant satellites 104. In some embodiments, the GNSS receiver 306 outputs may be combined with the output from the packet decoder logic 304 as shown in FIG. 3, while in other embodiments the GNSS receiver 306 outputs may be sent to the assistant satellites and/or ground station separately from the frequency and phase for each decoded symbol. Also in alternative embodiments, instead of using GNSS to assist the satellites in determining their position and precise time, ground-based radar may be used to estimate the positions of the satellites, and this satellite position information may be transmitted from the ground-based radar system to the satellites. Also in alternative embodiments, precise time may be transmitted from the ground to the satellites using the ground station 330, and precise time may then be maintained at the satellites over long periods using atomic clocks (which is the approach used by the GPS satellite constellation).

As described above, the assistant satellites 104 try to find the same symbols that were observed at the main satellite 102, adjusted for the Doppler frequency shifts. For example, with continued reference to FIG. 3, at circle (A1) the signals 106 from the receive radio beams at the assistant satellite 104 are received as input by the FFT decoder block 312, which converts the time-domain signals 106 to the frequency domain. While not shown in FIG. 3, the assistant satellite 104 includes antennas, such as one or more linear antenna arrays in which the antennas are spaced by up to one-half of a wavelength of the carrier frequency. In some embodiments, however, as described in further detail below, the assistant satellites 104 may have a smaller form factor than the main satellite 102, and may have fewer antennas than the main satellite 102. The FFT decoder block 312, at circle (A2), decodes data symbols from the signals 106 and outputs the decoded data symbols, which are passed as input to the bin selection logic 314 at circle (A3).

In some embodiments, the assistant satellites 104 also use the estimated positions of both the main satellite 102 and the respective assistant satellite 104 to estimate the Doppler frequency shifts, which are then used to estimate the frequencies of the arriving data symbols. In particular, the Doppler frequency adjustment logic 318 receives as input, from the main satellite 102 at circle M7, the frequency and phase for each decoded symbol, along with the main satellite's GNSS location. The main satellite 102 has decoded the data packet, where the data packet includes several data symbols that correspond to output bins of the FFT decoder block 302 (at the main satellite 102). The same data symbols that arrive at the assistant satellites 104 are shifted in frequency due to the Doppler shifts, so the output bins of the FFT decoder block 312 (at the assistant satellite 104) that are analyzed need to be corrected for these Doppler shifts. This function is performed by the bin selection logic 314, which uses the Doppler shift between the main and assistant satellites 102, 104 (as provided by the Doppler frequency adjustment logic 318) to estimate which output bins of the FFT decoder block 312 the data symbols should arrive at. Thus, at circle (A4), the GNSS receiver 316 of the assistant satellite 104 provides as input to the Doppler frequency adjustment logic 318 an estimated position of the assistant satellite 104. In some embodiments, this satellite position estimate may be smoothed out using the estimated satellite velocity and historical positions reported by the GNSS receiver 316. Also at circle (A4), the GNSS receiver 316 of the assistant satellite 104 provides as input to the Doppler frequency adjustment logic 318 the time synchronization information (the 1 PPS signal 106 described above). This signal 106 is used to estimate the frequency of the assistant satellite's digital sampling clock oscillator, and to synchronize the digital sampling clocks across the satellites used for estimating the endpoint 108 position, as described above with respect to the main satellite 102.

At circle (A5), the Doppler frequency adjustment logic 318 uses the inputs from the main satellite 102 and the GNSS receiver 316 to estimate the Doppler frequency shift at the assistant satellite 104 (f'D), and outputs the data symbol frequencies that the main satellite 102 decoded, adjusted for the Doppler frequency shift ($f_k$), at circle (A6). At circle (A7), the bin selection logic 314 uses the inputs from the FFT decoder block 312 and the Doppler frequency adjustment logic 318 to find the correct output bins of the FFT decoder block 312 for each data symbol arriving at the assistant satellite 104, and outputs those frequencies (FFT (f'$_k$)) at circle (A8).

At circle (A9), the main satellite symbol phase estimate logic 320 uses the input from the bin selection logic 314 and a guess of the time difference of arrival (TDOA Estimate 340) for each symbol to determine the phase of each symbol arriving at the main satellite 102. For example, in some embodiments the assistant satellite 104 multiplies the estimated symbol frequency plus the carrier frequency that arrived at the main satellite 102 by the TDOA Estimate 340 for each symbol, and then solves the optimization problem described above. To reduce the computational complexity for this optimization problem, the FFT decoder block 312 of the assistant satellite 104 may be the same size as the FFT decoder block 302 of the main satellite 102, though in alternative embodiments the FFT decoder blocks 302, 312 may be different sizes.

The main satellite symbol phase estimate logic 320 outputs the phase of each symbol arriving at the main satellite 102 at circle (A10), and at circle (A11) the phase match check logic 322 implements Eq. 9 (above) to find the best time difference of arrival between the main satellite 102 and the assistant satellite 104 using the phases found at the FFT outputs of the main and assistant satellites 102, 104 that correspond to the same data symbols. At circle (A12), the phase match check logic 322 outputs the best estimate of the TDOA (Best TDOA Estimate 350) between symbols arriving at the main satellite 102 versus symbols arriving at the assistant satellite 104, and this estimate is used as described above to estimate the position of the endpoint device 108.

As discussed above, in some embodiments the main satellite 102 and/or the assistant satellites 104 may send data to the ground station 330, and computations may be performed at the ground station 330 (e.g., using a ground-based computer network) to determine the location of the endpoint device 108. For example, in some embodiments the main satellite 102 may send the frequencies at which the endpoint 108 data symbols are received at the main satellite 102 to the assistant satellites 104. The assistant satellites 104 may then Doppler-correct these frequencies, and only send the phase information for these data symbols down to the ground station 330. In such embodiments, the assistant satellites 104 may not solve the optimization problem described above to find the Best TDOA Estimate 350. Rather, this step may be performed at the ground station 330 and/or using a ground-based computer network.

In some embodiments, the main satellite 102 may not send any information to the assistant satellites 104, but may instead send the information (e.g., the frequency and phase for each symbol received at the main satellite 102 and/or the main satellite's GNSS location) to the ground station 330. In such embodiments, the assistant satellites 104 may send their received RF time-domain data to the ground station 330 for processing. For example, the data may be post-processed on the ground by combining the information from the main satellite 102 in terms of which frequency and corresponding phase to analyze in the raw data that was transmitted from the assistant satellites 104. The raw data may be either sampled time-domain data across the entire receiver band, or the assistant satellites 104 may first perform an FFT of the time-domain data and send the frequency-domain data to the ground station 330. Both of these cases involve the same amount of data transfer to the ground station 330, although the second case saves the ground processing from needing to perform an FFT, which might be useful in certain cases.

Figure 4:
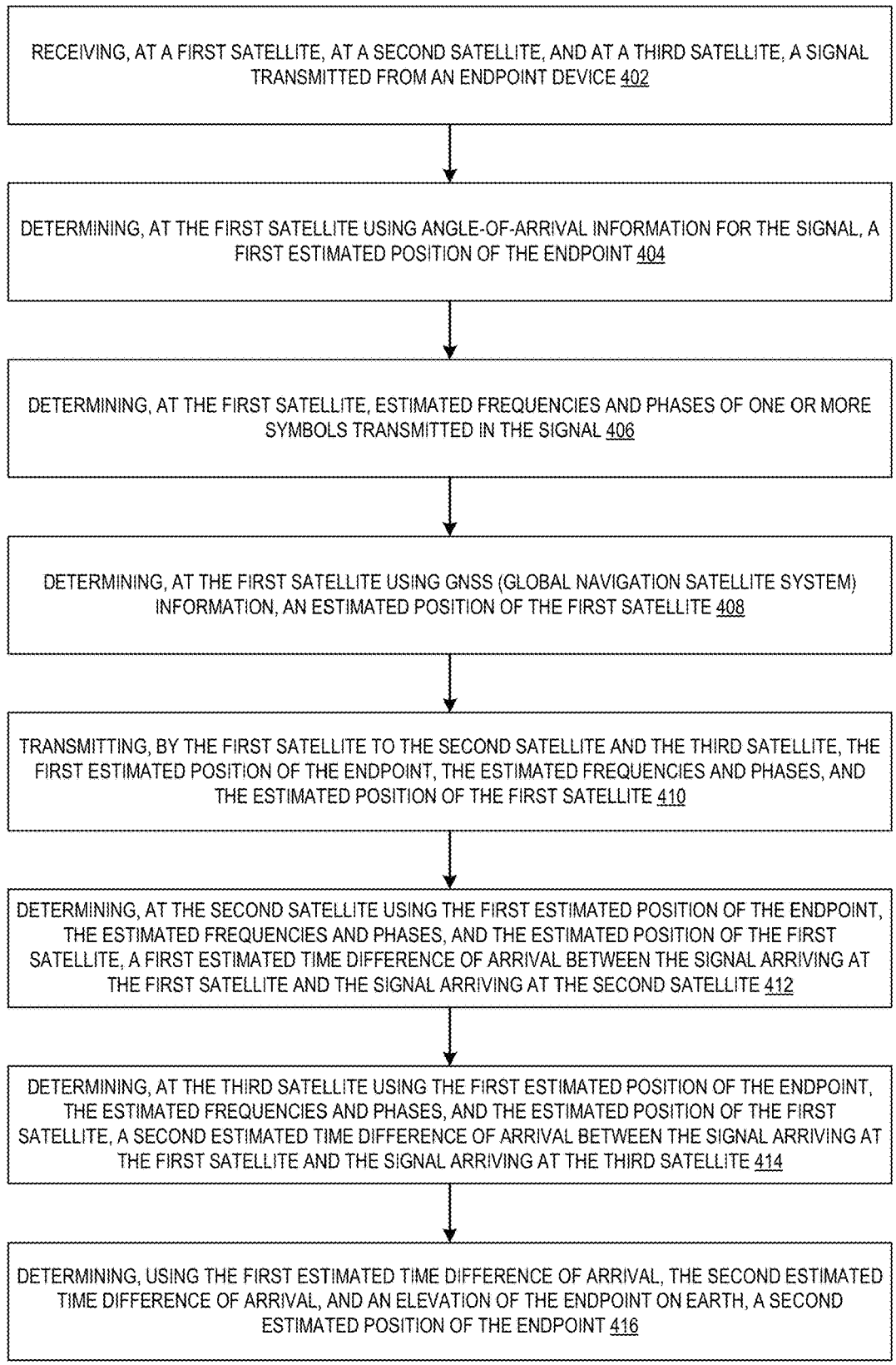
FIGS. 4-6 are flow diagrams illustrating operations of methods for position determination using satellites according to some embodiments.

FIG. 4 is a flow diagram illustrating operations 400 of a method for position determination using satellites according to some examples. Some or all of the operations 400 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 400 are performed by the satellites and/or ground station 330 of the other figures.

The operations 400 include, at block 402, receiving, at a first satellite, at a second satellite, and at a third satellite, a signal 106 transmitted from an endpoint device 108. For example, in some embodiments the signal 106 transmitted from the endpoint device 108 may be received by the main satellite 102 and at least two of the assistant satellites 104.

The operations 400 include, at block 404, determining, at the first satellite using angle-of-arrival information for the signal 106, a first estimated position of the endpoint 108. For example, in some embodiments the first satellite may determine the first estimated position of the endpoint 108 using the angle-of-arrival technique described in the Appendix.

The operations 400 include, at block 406, determining, at the first satellite, estimated frequencies and phases of one or more symbols transmitted in the signal 106. For example, in some embodiments the first satellite may determine the estimated frequencies and phases using an FFT decoder block 302, packet decoder logic 304, and a GNSS receiver 306, similar to the technique described above with respect to FIG. 3.

The operations 400 include, at block 408, determining, at the first satellite using GNSS (global navigation satellite system) information, an estimated position of the first satellite. For example, in some embodiments the first satellite may determine its estimated position using a GNSS receiver 306 and signals from satellites in a GNSS constellation.

The operations 400 include, at block 410, transmitting, by the first satellite to the second satellite and the third satellite, the first estimated position of the endpoint 108, the estimated frequencies and phases, and the estimated position of the first satellite.

The operations 400 include, at block 412, determining, at the second satellite using the first estimated position of the endpoint 108, the estimated frequencies and phases, and the estimated position of the first satellite, a first estimated time difference of arrival between the signal 106 arriving at the first satellite and the signal 106 arriving at the second satellite. For example, in some embodiments the second satellite may determine the first estimated time difference of arrival according to the technique described above with respect to the assistant satellite 104 illustrated in FIG. 3.

The operations 400 include, at block 414, determining, at the third satellite using the first estimated position of the endpoint 108, the estimated frequencies and phases, and the estimated position of the first satellite, a second estimated time difference of arrival between the signal 106 arriving at the first satellite and the signal 106 arriving at the third satellite. For example, in some embodiments the third satellite may determine the second estimated time difference of arrival according to the technique described above with respect to the assistant satellite 104 illustrated in FIG. 3.

The operations 400 include, at block 416, determining, using the first estimated time difference of arrival, the second estimated time difference of arrival, and an elevation of the endpoint 108 on Earth, a second estimated position of the endpoint 108. For example, in some embodiments a ground station 330 and/or a ground-based computer network may determine the second estimated position of the endpoint 108 according to the technique described above with respect to FIG. 3.

Figure 5:
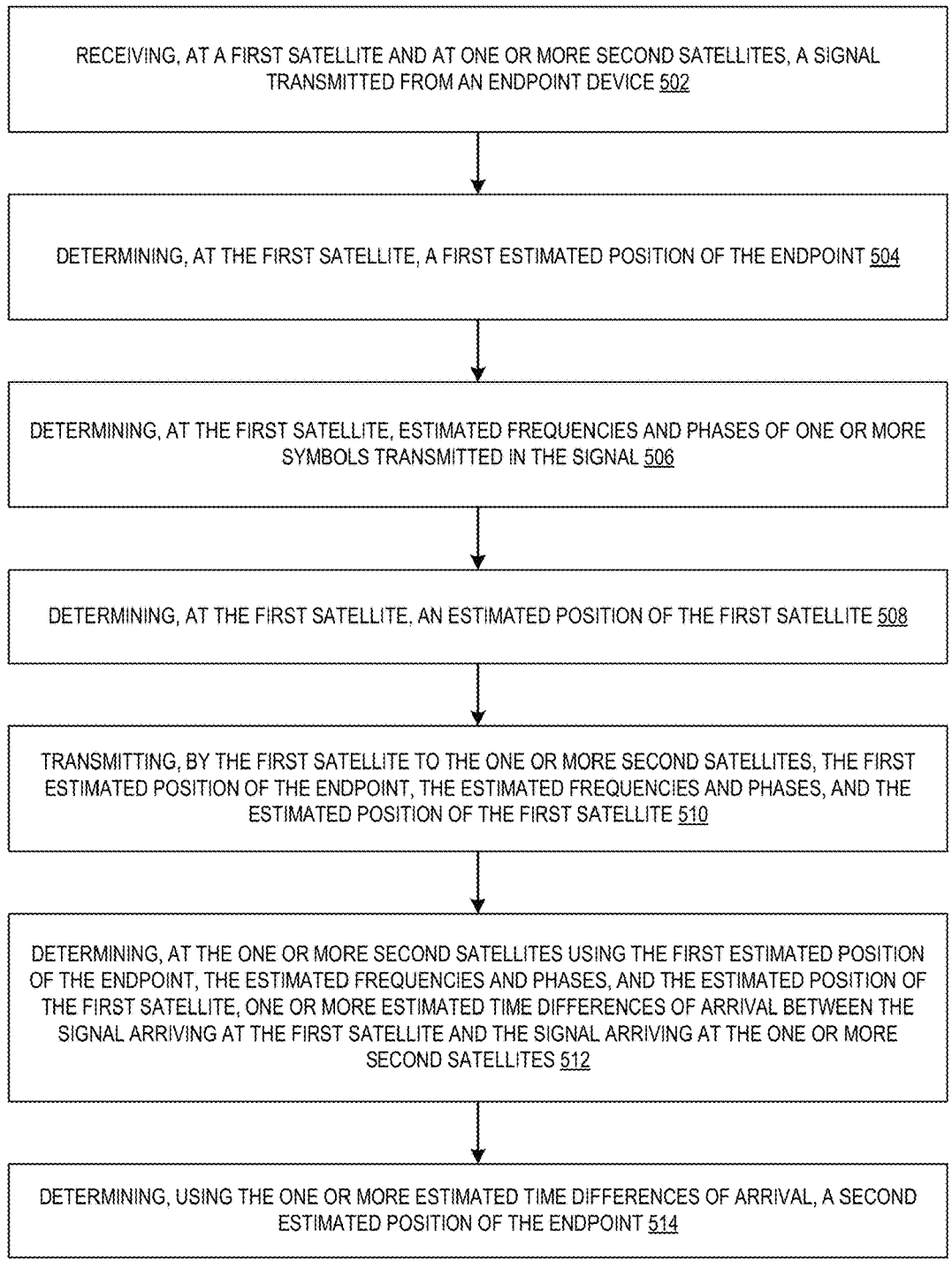

FIG. 5 is a flow diagram illustrating operations 500 of a method for position determination using satellites according to some examples. Some or all of the operations 500 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by satellites and/or ground station 330 of the other figures.

The operations 500 include, at block 502, receiving, at a first satellite and at one or more second satellites, a signal 106 transmitted from an endpoint device 108. For example, in some embodiments the signal 106 transmitted from the endpoint device 108 may be received by the main satellite 102 and at one or more of the assistant satellites 104.

The operations 500 include, at block 504, determining, at the first satellite, a first estimated position of the endpoint 108. For example, in some embodiments the first satellite may determine the first estimated position of the endpoint 108 using the angle-of-arrival technique described in the Appendix.

The operations 500 include, at block 506, determining, at the first satellite, estimated frequencies and phases of one or more symbols transmitted in the signal 106. For example, in some embodiments the first satellite may determine the estimated frequencies and phases using an FFT decoder block 302, packet decoder logic 304, and a GNSS receiver 306, similar to the technique described above with respect to FIG. 3.

The operations 500 include, at block 508, determining, at the first satellite, an estimated position of the first satellite. For example, in some embodiments the first satellite may determine its estimated position using a GNSS receiver 306 and signals from satellites in a GNSS constellation.

The operations 500 include, at block 510, transmitting, by the first satellite to the one or more second satellites, the first estimated position of the endpoint 108, the estimated frequencies and phases, and the estimated position of the first satellite.

The operations 500 include, at block 512, determining, at the one or more second satellites using the first estimated position of the endpoint 108, the estimated frequencies and phases, and the estimated position of the first satellite, one or more estimated time differences of arrival between the signal 106 arriving at the first satellite and the signal 106 arriving at the one or more second satellites. For example, in some embodiments the one or more second satellites may determine the one or more estimated time differences of arrival according to the technique described above with respect to the assistant satellite 104 illustrated in FIG. 3.

The operations 500 include, at block 514, determining, using the one or more estimated time differences of arrival, a second estimated position of the endpoint 108. For example, in some embodiments a ground station 330 and/or a ground-based computer network may determine the second estimated position of the endpoint 108 according to the technique described above with respect to FIG. 3.

Figure 6:
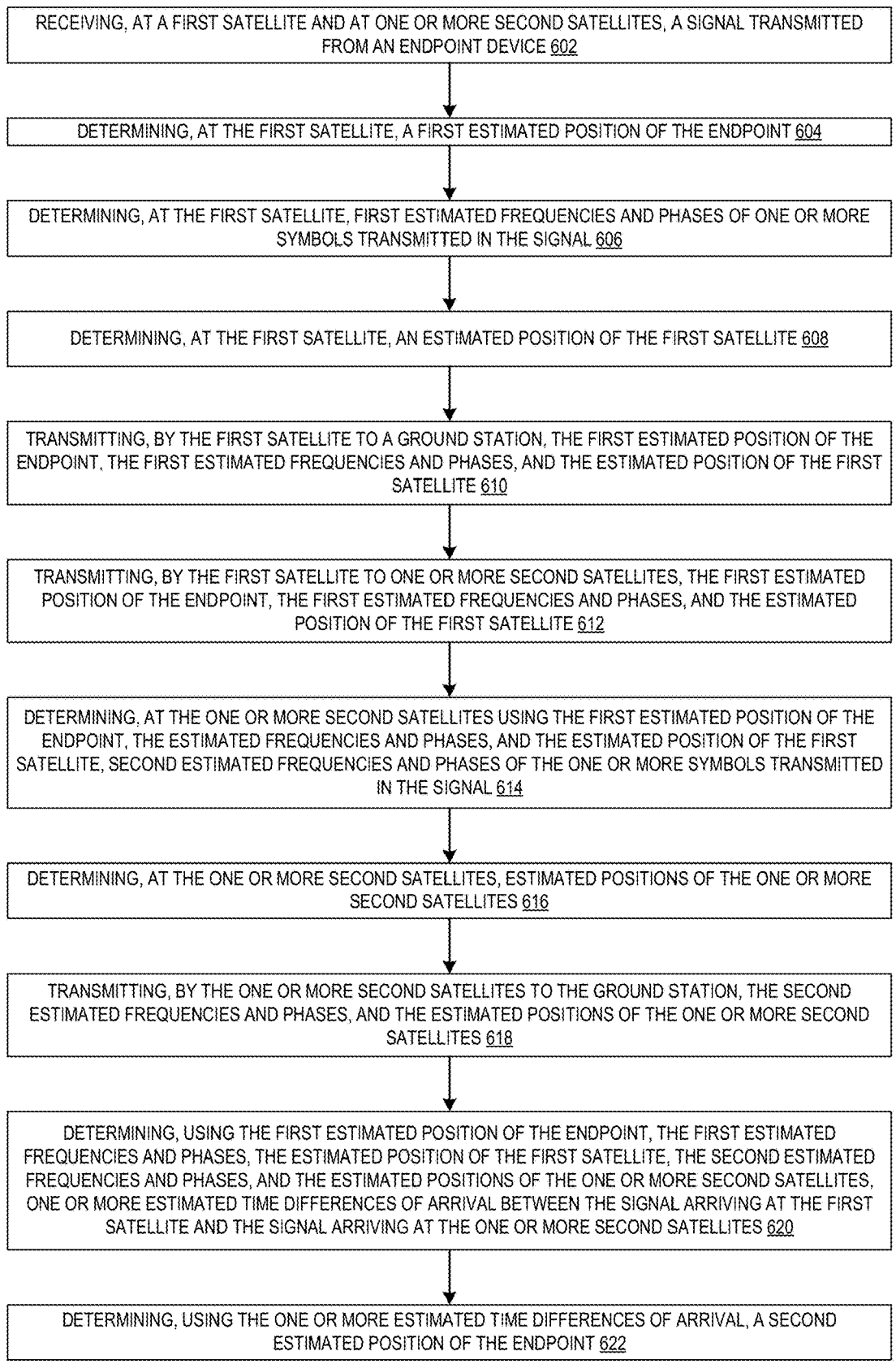

FIG. 6 is a flow diagram illustrating operations 600 of a method for position determination using satellites according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by satellites and/or ground station 330 of the other figures.

The operations 600 include, at block 602, receiving, at a first satellite and at one or more second satellites, a signal 106 transmitted from an endpoint device 108. For example, in some embodiments the signal 106 transmitted from the endpoint device 108 may be received by the main satellite 102 and at one or more of the assistant satellites 104.

The operations 600 include, at block 604, determining, at the first satellite, a first estimated position of the endpoint 108. For example, in some embodiments the first satellite may determine the first estimated position of the endpoint 108 using the angle-of-arrival technique described in the Appendix.

The operations 600 include, at block 606, determining, at the first satellite, first estimated frequencies and phases of one or more symbols transmitted in the signal 106. For example, in some embodiments the first satellite may determine the first estimated frequencies and phases using an FFT decoder block 302, packet decoder logic 304, and a GNSS receiver 306, similar to the technique described above with respect to FIG. 3.

The operations 600 include, at block 608, determining, at the first satellite, an estimated position of the first satellite. For example, in some embodiments the first satellite may determine its estimated position using a GNSS receiver 306 and signals from satellites in a GNSS constellation.

The operations 600 include, at block 610, transmitting, by the first satellite to a ground station 330, the first estimated position of the endpoint 108, the first estimated frequencies and phases, and the estimated position of the first satellite.

The operations 600 include, at block 612, transmitting, by the first satellite to one or more second satellites, the first estimated position of the endpoint 108, the first estimated frequencies and phases, and the estimated position of the first satellite.

The operations 600 include, at block 614, determining, at the one or more second satellites using the first estimated position of the endpoint 108, the estimated frequencies and phases, and the estimated position of the first satellite, second estimated frequencies and phases of the one or more symbols transmitted in the signal 106. For example, in some embodiments the one or more second satellites may determine the second estimated frequencies and phases according to the technique described above with respect to the assistant satellite 104 illustrated in FIG. 3.

The operations 600 include, at block 616, determining, at the one or more second satellites, estimated positions of the one or more second satellites. For example, in some embodiments the one or more second satellites may determine their estimated positions using GNSS receivers 316 and signals from satellites in a GNSS constellation.

The operations 600 include, at block 618, transmitting, by the one or more second satellites to the ground station 330, the second estimated frequencies and phases, and the estimated positions of the one or more second satellites.

The operations 600 include, at block 620, determining, using the first estimated position of the endpoint 108, the first estimated frequencies and phases, the estimated position of the first satellite, the second estimated frequencies and phases, and the estimated positions of the one or more second satellites, one or more estimated time differences of arrival between the signal 106 arriving at the first satellite and the signal 106 arriving at the one or more second satellites.

The operations 600 include, at block 622, determining, using the one or more estimated time differences of arrival, a second estimated position of the endpoint 108. For example, in some embodiments a ground station 330 and/or a ground-based computer network may determine the second estimated position of the endpoint 108 according to the technique described above with respect to FIG. 3.

Figure 7:
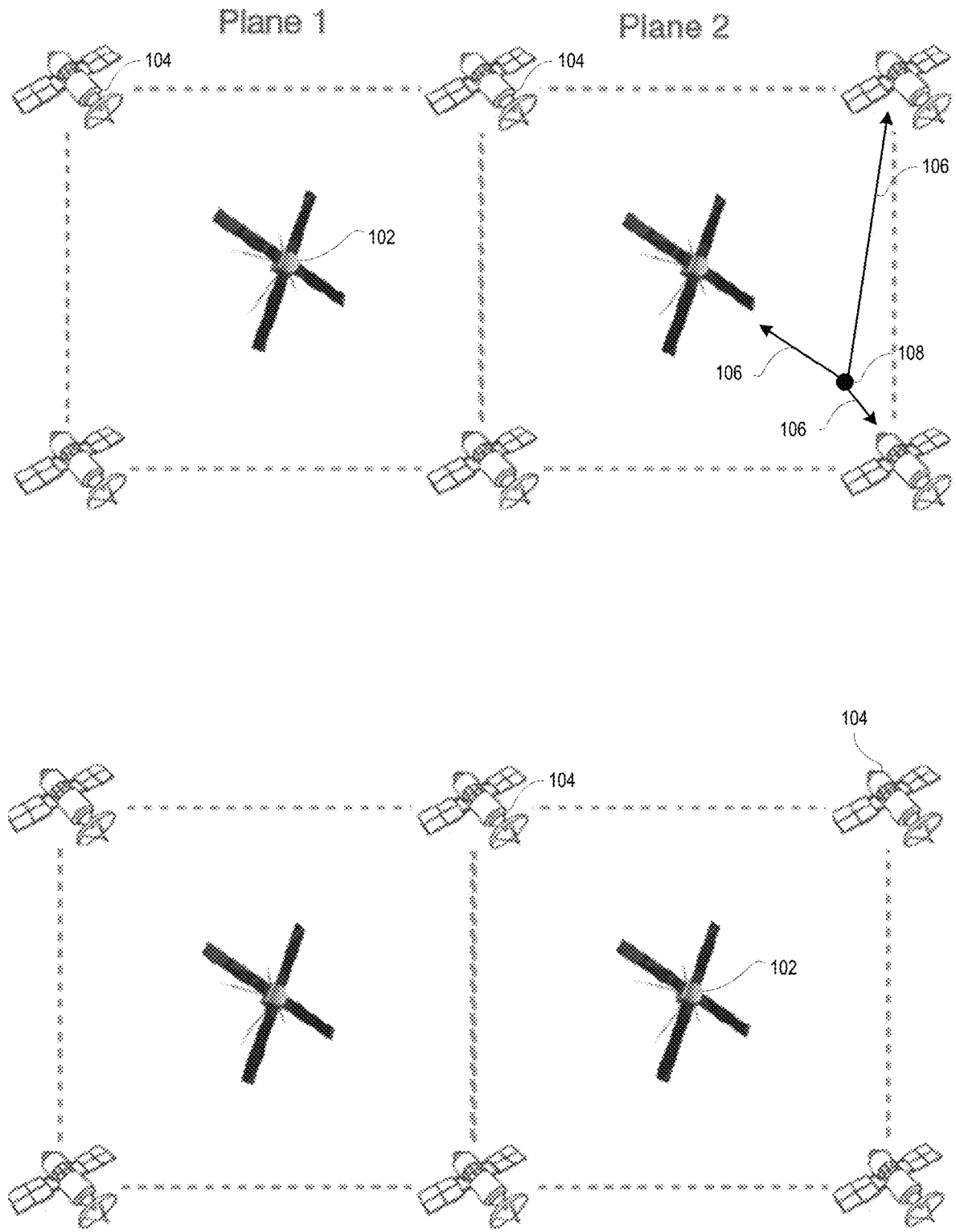
FIG. 7 is a schematic diagram illustrating a satellite constellation according to some embodiments.

FIG. 7 illustrates one example of a portion of a satellite constellation for determining positions of endpoint devices 108 according to some embodiments. As shown, a main satellite 102 may be in proximity to multiple assistant satellites 104. For example, in some embodiments the constellation may include two or more assistant satellites 104 for every main satellite 102. Such a configuration may enable the constellation to support GPS-level location accuracy. If the Z position of the endpoint 108 is known, for example because the endpoint 108 is not on a flying platform (e.g., an airplane), then only three satellites are needed to determine the X, Y position of the endpoint 108 (e.g., a main satellite 102 and two assistant satellites 104). In some embodiments, a topographical map of the Earth combined with the rough position estimate for the endpoint 108 determined by the main satellite 102 can be used to approximate the endpoint's Z position. When the endpoint signal 106 is received by more than two assistant satellites 104, the Z position of the endpoint 108 can be determined for endpoints 108 that have unknown altitudes, such as those aboard aircraft.

Figure 8:
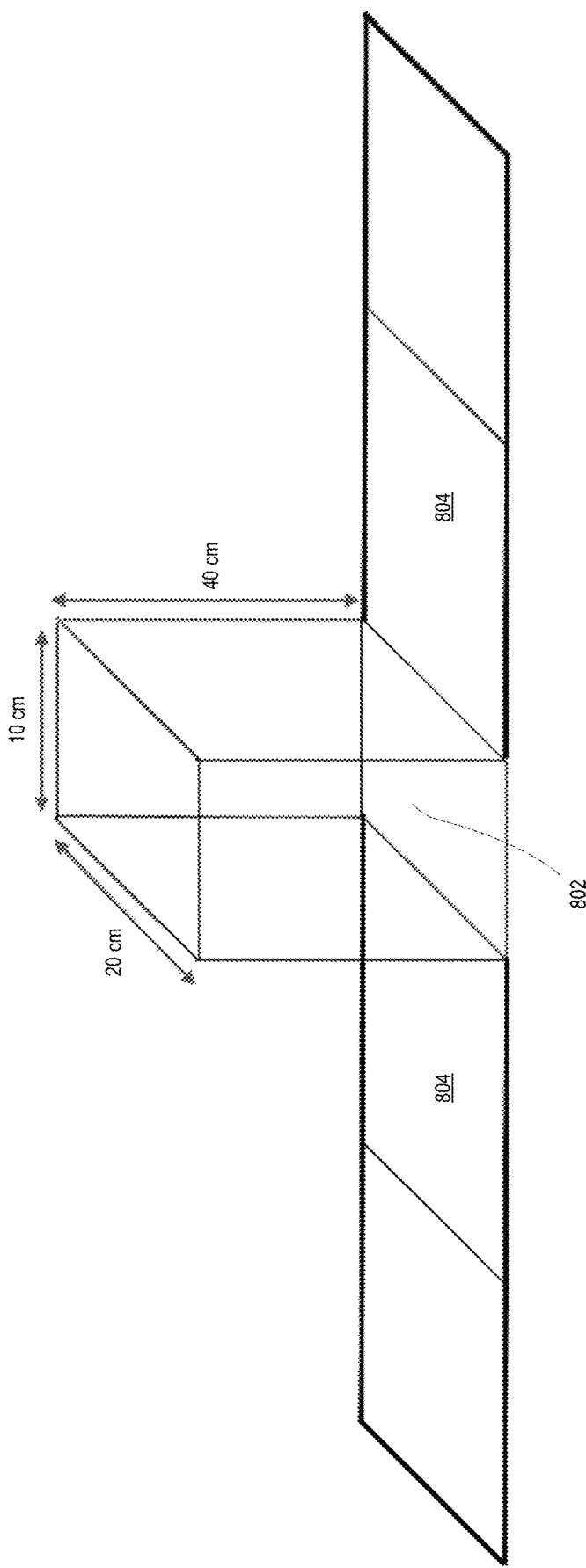
FIG. 8 is a schematic diagram illustrating an outline of a satellite according to some embodiments.

As described above, the assistant satellites 104 may have different form factors as compared to the main satellites 102. For example, in some embodiments the main satellites 102 may have a form factor of 16U and the assistant satellites 104 may have a form factor of 8U, where 1U, or one unit, is a cube with dimensions 10 cm×10 cm×10 cm. These sizes are only examples, and the satellites may have any sizes in various embodiments. FIG. 8 illustrates one non-limiting example configuration for the assistant satellites 104 in which a body portion 802 is shaped as a rectangular parallelepiped with dimensions of 20 cm×10 cm×40 cm. Solar panels 804 extend in opposite directions from the body portion 802.

The assistant satellites 104 preferably include enough antennas to provide sufficient link margin to obtain high enough accuracy of the TDOA using the phase matching operations described above. In some embodiments, the assistant satellites 104 can operate down to a sensitivity of below-153 dBm (10 dB weaker than the main satellite 102 decode sensitivity), but performance may be degraded when the signals 106 are weaker. In some embodiments, the assistant satellite 104 architecture may reuse a single spoke from the main satellite 102 antenna array. Since the power consumption for a single spoke is approximately half of two spokes, the battery pack for such an assistant satellite 104 can be half as large, solar panels can take up half as much area, and the reaction wheel can be smaller.

Tables I-III below present experimental results obtained in connection with the embodiments described herein. Table I presents the accuracy in measuring time-of-flight at the assistant satellites. The results presented in Table I are based on the transmitted symbol frequencies being uniformly distributed across a 781.25 kHz receiver band and using a 65,536-point FFT decoder block for packet decoding. A smaller FFT decoder block can also be used for packet decoding when combined with additional filtering to get better frequency resolution. The results presented in Table I also assume a local oscillator estimation error of +0.25 Hz on both the main and assistant satellites.

TABLE I

| Main Satellite Signal Strength | Assistant Satellite Signal Strength | Time-of-Flight Error (1 Sigma) |
| --- | --- | --- |
| −143 dBm | −143 dBm | 97 ns (nanoseconds) |
| −143 dBm | −149 dBm | 160 ns |
| −143 dBm | −155 dBm | 239 ns |
| −137 dBm | −143 dBm | 76 ns |
| −137 dBm | −137 dBm | 57 ns |

The experimental results then combine the time-of-flight measurement errors in a TDOA simulation. For the simulation, it is assumed that the 1 PPS timing from the GNSS receiver is filtered and can be made accurate to within 5 ns (1 sigma). This adds 5 ns to the time-of-flight measurement errors in Table I. If the signals arrive at the main and assistant satellites with a signal strength of −143 dBm, from Table I the total 1-sigma time-of-flight error is then around 102 ns.

GPS receiver datasheets typically specify the position error as a circular error probability (CEP) number. For example, UBlox specifies a 2 m error in ideal conditions with −130 dBm signal strength received from six or more GPS satellites. This means that 50% of the time the error will be bounded within a circle of radius 2 meters. Using the CEP, the results of the simulation are shown in Table II below.

TABLE II

| Main Satellite Signal Strength | Assistant Satellite Signal Strength | Circular Error Probability (50%) |
| --- | --- | --- |
| −143 dBm | −143 dBm | 91 m |
| −137 dBm | −137 dBm | 60 m |

The position accuracy can be improved if the number of assistant satellites is increased, or the antenna array size is increased for either or both of the main satellite or the assistant satellites, or the receiver bandwidth is increased. For example, doubling the receiver bandwidth would improve the location accuracy by 2×. Even without any of these improvements, it is expected the approach described herein will obtain at least 10× better position accuracy than can be achieved using only the main satellite's angle-of-arrival positioning algorithm described in the Appendix. For example, doubling the receiver bandwidth by a factor of two, to 1.562 MHz, and having symbols transmit randomly across the band, gives the results shown in Table III below.

TABLE III

| Main and Assistant Satellite Signal Strengths | Time-of-Flight Error (1 Sigma) | Circular Error Probability (50%) |
|---|---|---|
| −143 dBm | 60 ns | 62 m |
| −137 dBm | 28 ns | 32 m |

In some embodiments, all satellites in the constellation may be main satellites (e.g., 8U, 16U, or other satellite/ antenna configurations), rather than a mix of main satellites and assistant satellites. In such embodiments, each satellite has the ability to decode packets and estimate the frequency and phase parameters of each symbol independently. The frequency and phase parameters may be sent to a ground station as the satellites pass over the ground station, and the time-of-flight measurements may then be computed using a computer network. This process advantageously doesn't include any message passing between/among satellites. However, disadvantageously the receiver sensitivity of the assistant satellites needs to be higher in this case, since the assistant satellites need to be capable of decoding packets, rather than just doing phase-matching computations. In the case where all satellites in the constellation are main satellites, the main satellites need not all be identical and need not all have the same configuration and/or capabilities. However, at least one of the main satellites needs to have enough antennas in the correct geometry (e.g., spokes or a square array) to compute a rough estimate of endpoint device's position, which is then used to estimate the Doppler shifts between the endpoint and the other satellites.

In alternative embodiments, the satellites may have a single-spoke geometry, and packet decodes may be performed using a ground-based computer network. In some embodiments, a rough estimate of the endpoint position may be obtained as long as the spokes are not oriented colinearly. The rough estimate of the endpoint position may be used to estimate Doppler shifts at the assistant satellites, as described above.

In some embodiments, the difference in time-of-flight from the main satellite to the assistant satellites may be on the order of 2 ms (milliseconds), and the symbols may be 8 ms long. In such embodiments, the sampling start time for each satellite may be adjusted to enhance the overlap time for the phase-matching operation. Since the main satellite estimates the rough position of the endpoint, and each satellite knows its position, each satellite may compute approximately when it should start lining up the received signal during the phase-matching operation. The different sampling start times for each satellite may then be factored into the TDOA computations. For the TDOA computations, the positions of the main satellite and assistant satellites is the position of the respective satellite when the first sample is taken of the symbol.

Illustrative Systems

Figure 9:
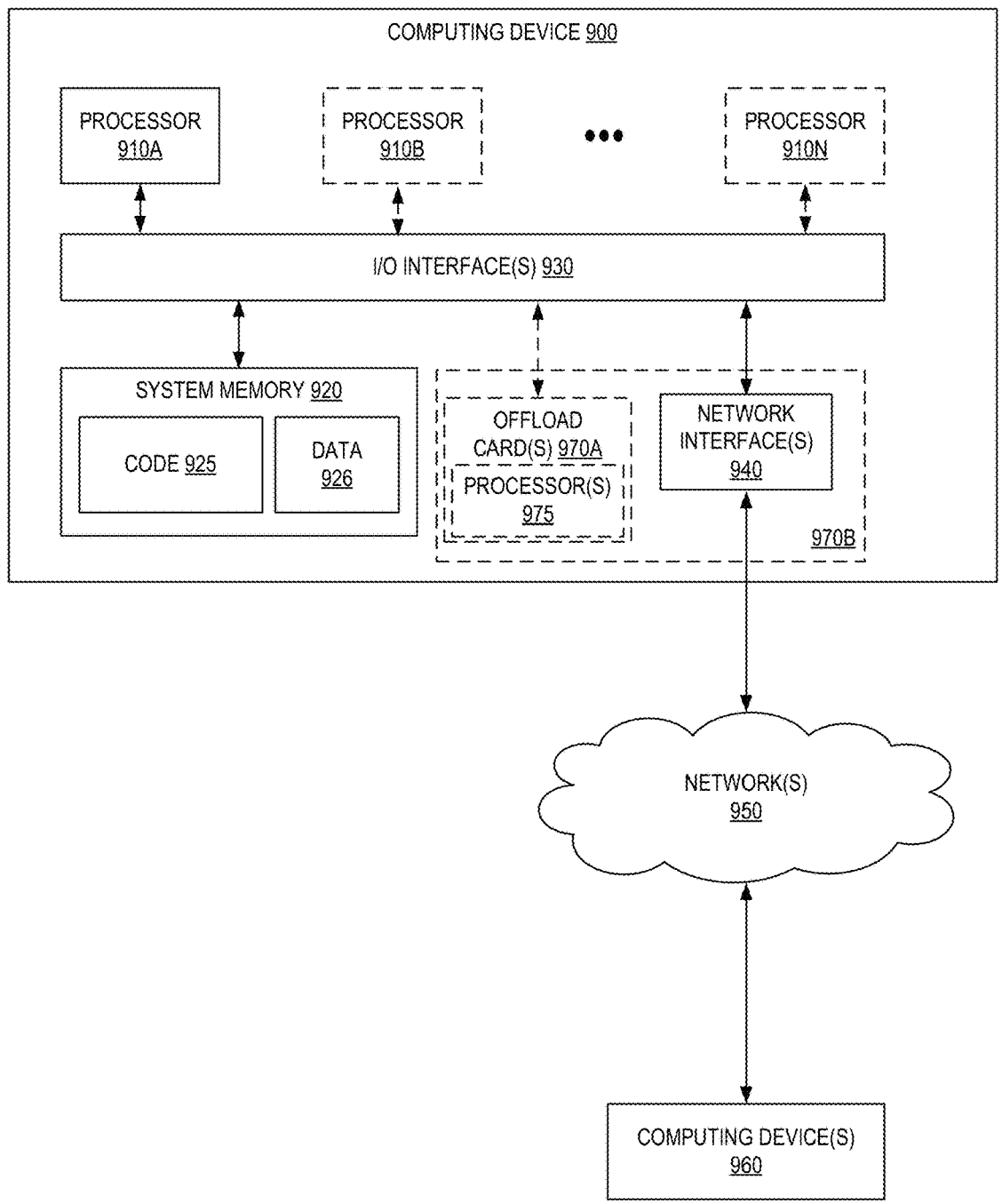
FIG. 9 is a block diagram illustrating an example computing device that can be used in some examples.

In some examples, a system that implements a portion or all of the techniques described herein can include a general-purpose computer system, such as the computing device 900 (also referred to as a computing system or electronic device) illustrated in FIG. 9, that includes, or is configured to access, one or more computer-accessible media. In the illustrated example, the computing device 900 includes one or more processors 910 coupled to a system memory 920 via an input/output (I/O) interface 930. The computing device 900 further includes a network interface 940 coupled to the I/O interface 930. While FIG. 9 shows the computing device 900 as a single computing device, in various examples the computing device 900 can include one computing device or any number of computing devices configured to work together as a single computing device 900.

In various examples, the computing device 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as code 925 and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computing device 900 and other computing devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computing device 900. However, in some examples the virtualization manager implemented by the offload card(s) 970A or 970B can accommodate requests from other entities (e.g., from compute instances themselves), and can not coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 910A-910N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean any of A, B, or C, or any combination thereof (e.g., A, B, and/or C). Similarly, language such as "at least one or more of A, B, and C" (or "one or more of A, B, and C") is intended to be understood to mean any of A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. This term does not foreclose additional factors that may affect a determination or action. For example, a determination may be solely based on the factor(s) listed or based on the factor(s) and one or more additional factors. Thus, if an action A is "based on" B, then B is one factor that affects action A, but this does not foreclose the action A from also being based on one or more other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (meaning having the potential to), rather than the mandatory sense (meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving, at a first satellite, at a second satellite, and at a third satellite, a signal transmitted from an endpoint device;
determining, at the first satellite using angle-of-arrival information for the signal, a first estimated position of the endpoint;
determining, at the first satellite, estimated frequencies and phases of one or more symbols transmitted in the signal;
determining, at the first satellite using GNSS (global navigation satellite system) information, an estimated position of the first satellite;
transmitting, by the first satellite to the second satellite and the third satellite, the first estimated position of the endpoint, the estimated frequencies and phases, and the estimated position of the first satellite;
determining, at the second satellite using the first estimated position of the endpoint, the estimated frequencies and phases, and the estimated position of the first satellite, a first estimated time difference of arrival between the signal arriving at the first satellite and the signal arriving at the second satellite;

determining, at the third satellite using the first estimated position of the endpoint, the estimated frequencies and phases, and the estimated position of the first satellite, a second estimated time difference of arrival between the signal arriving at the first satellite and the signal arriving at the third satellite; and determining, using the first estimated time difference of arrival, the second estimated time difference of arrival, and an elevation of the endpoint on Earth, a second estimated position of the endpoint.

2. The computer-implemented method of claim 1, wherein determining the first estimated time difference of arrival is further based on a first estimated Doppler shift of the estimated frequencies determined at the first satellite and a second estimated Doppler shift of the estimated frequencies determined at the second satellite.

3. The computer-implemented method of claim 2, wherein determining the first estimated time difference of arrival further comprises using the first estimated Doppler shift and the second estimated Doppler shift to solve for an optimal time difference of arrival between the signal arriving at the first satellite and the signal arriving at the second satellite.

4. A computer-implemented method comprising:
receiving, at a first satellite and at a plurality of second satellites, a signal transmitted from an endpoint device;
determining, at the first satellite, a first estimated position of the endpoint;
determining, at the first satellite, estimated frequencies and phases of one or more symbols transmitted in the signal;
determining, at the first satellite, an estimated position of the first satellite;
transmitting, by the first satellite to the second satellites, the first estimated position of the endpoint, the estimated frequencies and phases, and the estimated position of the first satellite;
determining, at the second satellites using the first estimated position of the endpoint, the estimated frequencies and phases, and the estimated position of the first satellite, estimated time differences of arrival between the signal arriving at the first satellite and the signal arriving at respective ones of the second satellites; and
determining a second estimated position of the endpoint using either:
at least three of the estimated time differences of arrival and an elevation of the endpoint on Earth; or
at least four of the estimated time differences of arrival.

5. The computer-implemented method of claim 4, wherein determining the first estimated position of the endpoint comprises using angle-of-arrival information for the signal.

6. The computer-implemented method of claim 5, wherein the angle-of-arrival information for the signal comprises a ratio of beam amplitudes between adjacent receive beams of the first satellite.

7. The computer-implemented method of claim 4, wherein determining the estimated time differences of arrival is further based on estimated positions of the second satellites.

8. The computer-implemented method of claim 4, wherein determining the estimated time differences of arrival is further based on a first estimated Doppler shift of the estimated frequencies determined at the first satellite and second estimated Doppler shifts of the estimated frequencies determined at the second satellites.

9. The computer-implemented method of claim 4, further comprising:
determining an estimated oscillation frequency of an oscillator of the first satellite using a pulse-per-second (PPS) signal; and
determining, using the estimated oscillation frequency, a carrier frequency offset for the estimated frequencies of the one or more symbols transmitted in the signal.

10. The computer-implemented method of claim 4, further comprising receiving the estimated time differences of arrival at a ground station, wherein determining the second estimated position of the endpoint is performed using a ground-based computer network.

11. The computer-implemented method of claim 4, wherein determining the second estimated position of the endpoint comprises weighting the estimated time differences of arrival according to respective receive signal strengths of the satellites.

12. The computer-implemented method of claim 4, further comprising time-synchronizing the satellites.

13. A computer-implemented method comprising:
receiving, at a first satellite and at a plurality of second satellites, a signal transmitted from an endpoint device;
determining, at the first satellite, a first estimated position of the endpoint;
determining, at the first satellite, first estimated frequencies and phases of one or more symbols transmitted in the signal;
determining, at the first satellite, an estimated position of the first satellite;
transmitting, by the first satellite to a ground station, the first estimated position of the endpoint, the first estimated frequencies and phases, and the estimated position of the first satellite;
transmitting, by the first satellite to the second satellites, the first estimated position of the endpoint, the first estimated frequencies and phases, and the estimated position of the first satellite;
determining, at the second satellites using the first estimated position of the endpoint, the estimated frequencies and phases, and the estimated position of the first satellite, second estimated frequencies and phases of the one or more symbols transmitted in the signal;
determining, at the second satellites, estimated positions of the second satellites;
transmitting, by the second satellites to the ground station, the second estimated frequencies and phases, and the estimated positions of the second satellites;
determining, using the first estimated position of the endpoint, the first estimated frequencies and phases, the estimated position of the first satellite, the second estimated frequencies and phases, and the estimated positions of the second satellites, estimated time differences of arrival between the signal arriving at the first satellite and the signal arriving at respective ones of the second satellites; and
determining a second estimated position of the endpoint using either:
at least three of the estimated time differences of arrival and an elevation of the endpoint on Earth; or
at least four of the estimated time differences of arrival.

14. The computer-implemented method of claim 13, wherein determining the estimated time differences of arrival and determining the second estimated position of the endpoint are performed using a ground-based computer network.

15. The computer-implemented method of claim 13, wherein determining the first estimated position of the endpoint comprises using angle-of-arrival information for the signal.

16. The computer-implemented method of claim 15, wherein the angle-of-arrival information for the signal comprises a ratio of beam amplitudes between adjacent receive beams of the first satellite.

17. The computer-implemented method of claim 13, wherein determining the estimated time differences of arrival is further based on a first estimated Doppler shift of the estimated frequencies determined at the first satellite and second estimated Doppler shifts of the estimated frequencies determined at the second satellites.

18. The computer-implemented method of claim 13, further comprising:
- determining an estimated oscillation frequency of an oscillator of the first satellite using a pulse-per-second (PPS) signal; and
- determining, using the estimated oscillation frequency, a carrier frequency offset for the estimated frequencies of the one or more symbols transmitted in the signal.

19. The computer-implemented method of claim 13, wherein determining the second estimated position of the endpoint is performed using a ground-based computer network.

20. The computer-implemented method of claim 13, wherein determining the second estimated position of the endpoint comprises weighting the estimated time differences of arrival according to respective receive signal strengths of the satellites.

* * * * *